June 2, 1964

A. BOSSETTI 3,135,037

PASSAGE CONTINUOUS KILN FOR FIRING CERAMIC MATERIAL

Filed Dec. 19, 1960

INVENTOR

ADRIANO BOSSETTI

BY Irwin S. Thompson

ATTORNEY

3,135,037
PASSAGE CONTINUOUS KILN FOR FIRING CERAMIC MATERIAL
Adriano Bossetti, % Racheli Bossi & C., Via P. Verri 6, Milan, Italy
Filed Dec. 19, 1960, Ser. No. 76,922
1 Claim. (Cl. 25—142)

The present invention relates to continuous tunnel kilns for firing ceramic material and more particularly to a kiln of said type having its sole consisting of parallel supporting rollers separated from each other by substantially tangential support surfaces, as described hereinafter.

The invention represents an improvement of the invention described in my Patent No. 2,945,279 wherein are described and claimed kilns having multiple baking tunnels, and in which the sole of each tunnel is made of a plurality of rollers having their axes horizontal and parallel to each other and mechanically controlled from the outside of the kiln, so that they rotate in unison and cause a forward movement of the plates on which the ceramic material is placed to undergo the baking or firing operation.

It has been found, however, that with this type of kiln some inconveniences may arise, should one of the silicon carbide or refractory plates, that carry the material for the firing process, happen to break during its travel through the kiln. In this event, the broken material would fall between two rollers, causing the obstruction of the tunnel. In such circumstances it would be necessary to clear the obstructed tunnel, a measure involving some difficulty and then again start the system.

The object of the present invention is to improve the previously mentioned system by preventing the material, destined for the firing process, from causing any obstruction in the kiln during its operation, should one of the plates happen to break, an inconvenience that may take place rather easily on account of the high temperatures at which these kilns are operated.

According to this improvement, the rollers that are provided for the travelling movement of the plates that carry the material to be fired, are not adjacent to each other but are located at a certain distance one from the other projecting slightly from the seats provided for them in the blocks that incorporate the electric heating resistance. The distance between two adjacent rollers is shorter than the length of a load carrying plate and by this arrangement, whilst the rollers are able to develop the travelling movement of the load carrying plates, a broken plate and its carried material, in case it should break during its travel in the kiln, would merely seat on the electric heating housing block and still continue to be pushed out of the kiln by the next travelling load carrying plate.

The present invention will be more closely described by the following detailed description by way of example only with reference to the accompanying drawings in which.

Figure 1:
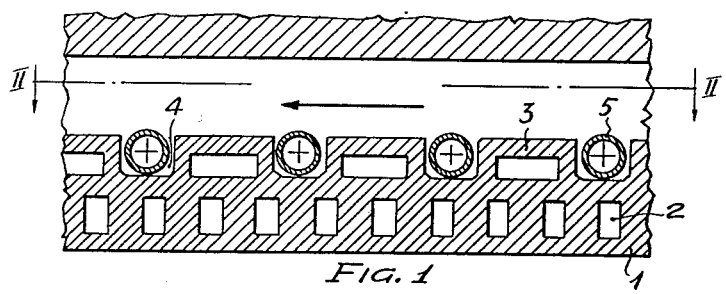
FIGURE 1 shows the elevation cross section of a tunnel kiln for the baking of ceramic material according to the present invention.
Figure 2:
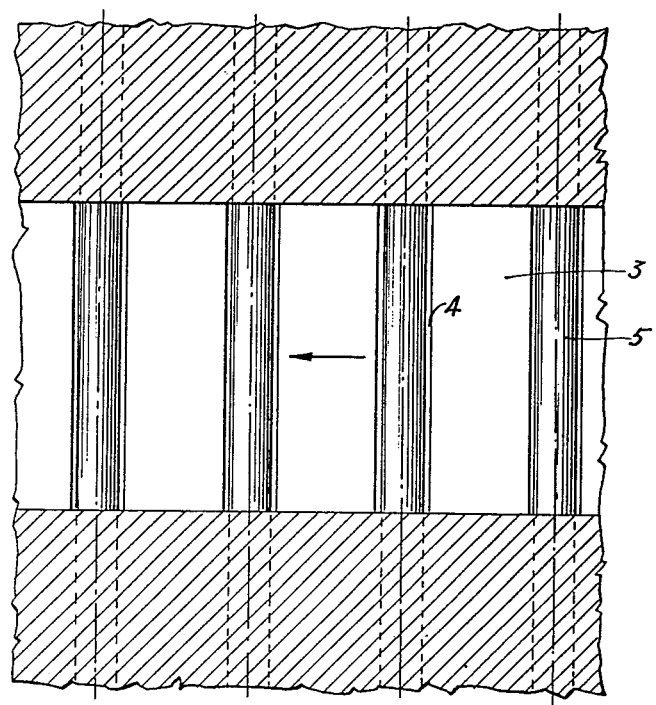
FIGURE 2 is a plan cross sectional view of a portion of the kiln showing only one of the plural tunnels, the view being taken along line II—II in FIGURE 1 and seen in the direction indicated by the arrows.

The base of each tunnel of the kiln is constituted by the heating resistance carrying blocks 1 which are made of different refractory materials according to the value of temperature existing in the kiln at the corresponding zone in which each block is located; in the fire zone, for instance, it may be made of sillimanite. The blocks 1 are provided with through holes 2 which are suitable to house the electric resistances provided for the heating of the kiln, and these blocks 1, besides constituting the base of the tunnel also form the ceiling of another tunnel running beneath. Although the partial cross section shown in FIGURE 2 has a single tunnel, it is obvious that additional tunnels may be provided to either side of the one illustrated on the same horizontal level. In other words, the kiln being considered may be a multitunnel kiln if desired.

The upper part 3 of these blocks 1 is shaped to form a seat 4 in which the rollers 5 with their revolving arrangement are mounted. The distance between the cross passages 4 is such, that the distance between the axes of two adjacent rollers 5 is less than the length of the plates that carry the material to be fired, so that the rollers, through their rotation, cause the said plates to travel through the kiln.

Figure 3:
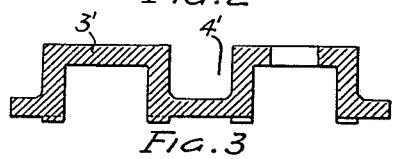
FIGURE 3 shows the cross section of a detail referring to an alternate embodiment.

According to an alternative arrangement as represented by FIG. 3, the upper part 3, or protecting slab of the resistance housing block 1, is separate from the electric resistance housing block 1, and may be shaped as depicted at $3^1$ in FIG. 3 and forming seats $4^1$, so that it may be suitably fitted to any block 1.

The rollers slightly protrude, about 2 mm., from the flat surface 3 of block 1, so that, should any load carrying plate happen to break even into small pieces, the plate itself will just seat on the flat surface 3 of the block and then be pushed through the entire length of the kiln tunnel by the load carrying plates that are following.

The roller control system and other construction details are not included in this description because they have already been fully described in the aforementioned patent of the same applicant.

It will be understood that various modifications may be made to the invention without departing from the scope of the appended claim.

What I claim is:

A continuous tunnel kiln for firing ceramic material transported therethrough upon load-carrying plates comprising a plurality of adjacent tunnels each having a sole and a ceiling, each of said soles comprising a plurality of electric heating resistance housing blocks, each housing block having a lower section and an upper section mounted upon said lower section, a plurality of recessed seats located at the top horizontal surfaces of said upper sections, said recessed seats being oriented transversely with respect to the longitudinal axes of said tunnels, and a plurality of rollers, each of said rollers being rotatably mounted within a separate one of said recessed seats substantially tangential to said top horizontal surfaces but projecting slightly from the housing block, said rollers being spaced apart so that the distance between axes of adjacent rollers is less than the length of said load-carrying plates, the portions of the top horizontal surfaces of said upper sections between said seats forming supports for said plates so that broken plates cannot obstruct said tunnels.

References Cited in the file of this patent
UNITED STATES PATENTS

| | | |
|---|---|---|
| 1,425,499 | Lewis | Aug. 8, 1922 |
| 1,539,833 | Fahrenwald | June 2, 1925 |
| 1,676,590 | Stuler | July 10, 1928 |
| 1,818,154 | Nobbe | Aug. 11, 1931 |
| 2,945,279 | Bossetti | July 19, 1960 |